United States Patent
Curd et al.

(10) Patent No.: US 9,384,465 B2
(45) Date of Patent: Jul. 5, 2016

(54) MERGING CONTRACT VERSIONS

(75) Inventors: Ian Curd, Christchurch (NZ); André Veringa, Maarn (NL)

(73) Assignee: IHEARTMEDIA MANAGEMENT SERVICES, INC., San Antonio, TX (US)

( * ) Notice: Subject to any disclaimer, the term of this patent is extended or adjusted under 35 U.S.C. 154(b) by 582 days.

(21) Appl. No.: 13/589,261

(22) Filed: Aug. 20, 2012

(65) Prior Publication Data

US 2012/0310790 A1    Dec. 6, 2012

Related U.S. Application Data

(62) Division of application No. 12/502,872, filed on Jul. 14, 2009.

(51) Int. Cl.
| | |
|---|---|
| *G06F 3/00* | (2006.01) |
| *G06Q 10/10* | (2012.01) |
| *G06Q 10/06* | (2012.01) |
| *G06Q 30/04* | (2012.01) |
| *G06Q 50/18* | (2012.01) |

(52) U.S. Cl.
CPC .............. *G06Q 10/10* (2013.01); *G06Q 10/063* (2013.01); *G06Q 30/04* (2013.01); *G06Q 50/18* (2013.01)

(58) Field of Classification Search
CPC ........................................................ G06F 3/00
USPC ................. 715/256, 273, 700, 781; 705/27.1
See application file for complete search history.

(56) References Cited

U.S. PATENT DOCUMENTS

| | | | |
|---|---|---|---|
| 5,692,206 A * | 11/1997 | Shirley et al. ................. | 715/256 |
| 6,067,531 A * | 5/2000 | Hoyt et al. ...................... | 705/35 |
| 7,007,227 B1 * | 2/2006 | Constantino et al. ......... | 715/256 |
| 7,200,605 B2 * | 4/2007 | Baker | |
| 2003/0001965 A1* | 1/2003 | Cao et al. ...................... | 348/515 |
| 2004/0230892 A1 | 11/2004 | Horton | |
| 2005/0266796 A1* | 12/2005 | Steelberg et al. ............. | 455/3.06 |
| 2006/0277123 A1* | 12/2006 | Kennedy et al. ................ | 705/35 |
| 2006/0287966 A1* | 12/2006 | Srinivasaraghavan et al. . | 705/80 |
| 2007/0255694 A1* | 11/2007 | Wu ................................. | 707/3 |

* cited by examiner

*Primary Examiner* — Amy Ng
*Assistant Examiner* — Meseker Takele
(74) *Attorney, Agent, or Firm* — Garlick & Markison; Edward Marshall (57) ABSTRACT

Proposed revisions to a contract can be selectively merged with provisions included in a base version of a contract to generate a merged contract. To determine whether a particular provision in the merged contract should be selected from the base contract or the proposed revision to the contract, a check can be made to determine if an event affecting a provision in the base contract has occurred. If such an event has occurred, the contract provision from the base contract can be chosen for the merged contract. Otherwise, a provision from the proposed revision to the contract can be used in the merged contract. A graphical user interface (GUI) can be used to present various contract versions.

20 Claims, 5 Drawing Sheets

MERGING CONTRACT VERSIONS

RELATED APPLICATIONS

This application claims priority pursuant to 35 U.S.C. §120, as a divisional, to the following U.S. Utility Patent Application which is hereby incorporated herein by reference in its entirety and made part of the present U.S. Utility Patent Application for all purposes:

U.S. Utility application Ser. No. 12/502,872, entitled "Merging Contract Versions,", filed Jul. 14, 2009, pending.

FIELD

The present disclosure relates generally to contract revisions, and more particularly to merging multiple versions of a contract.

BACKGROUND

Keeping track of contract revisions can be a difficult and time consuming task, particularly in industries like radio broadcasting, where contract terms and provisions are in seemingly constant flux. Often, when changes to an existing contract are proposed, the proposed revisions are put through an approval process, where they are compared and evaluated by a supervisor controller, attorney, contract specialist, or other individual. In some situations, especially those involving significant time and volume pressures, errors can occur. These errors can cause problems that may require a significant time commitment to fix, or in extreme cases, can result in the loss of a valued client. It is apparent, therefore, that currently available techniques for processing contract revisions are less than perfect.

SUMMARY

Provisions from different versions of a contract can be selectively merged depending on whether an intervening event affecting one or more of the contract provisions has occurred. A base version of a contract and a proposed revision to the contract can be obtained from a dedicated database, a server, volatile or non-volatile memory, directly from user input, or from another suitable source. A determination is made regarding whether an event affecting a contract provision in the base contract has occurred. The contract provision from the base contract can be selected for inclusion in a merged contract if it is determined that such an event has occurred. If an event affecting the contract provision has not occurred, a contract provision from the proposed contract can be chosen for inclusion in the merged contract. The merged contract including the selected provisions can then be generated.

In some embodiments, checks can be made to determine if various provisions are included in the base contract or the revised contract, and a decision to include a particular provision can be based on that determination.

Determining whether an event that affects a provision has occurred can include determining if a portion of a current original charge or billing plan, included in the base version of the contract, has been billed. If at least a portion of the current original charge or billing plan has been billed the current original charge or billing plan can be included in the merged contract. If not, a current revised charge or billing plan from a proposed revision of the contract can be selected for inclusion in the merged contract. Determining whether an event that affects a provision has occurred can also include determining if a current original spotline included in the base version of the contract has aired, selecting the current original spotline for inclusion in the merged contract if at least a portion of the current original spotline has aired, and selecting a current revised spotline from the proposed revision for inclusion in the merged contract if at least a portion of the current original spotline has not aired.

In some embodiments, a determination is made regarding whether a base version of a contract has been at least partially performed. At least one general field of the merged contract can be set based on the results of the determination.

Some embodiments can be implemented as a system including a memory configured to store a program of computer readable instructions, and a processor operably coupled to the memory and configured to execute the program of instructions stored in the memory. The program of instructions to implement the various methods and techniques described herein.

Furthermore, various embodiments can take the form of a graphical user interface (GUI) having a first area displaying information associated with a base contract, a second area displaying information associated with a proposed contract, and a third area displaying information associated with a merged contract. The information displayed in the third area associated with the merged contract can include information selected from at least one of the base contract and the proposed contract. In some embodiments, the information displayed in the third area includes at least one provision from the first area and at least one provision from the second area.

The GUI can include a field in the third area that is capable of accepting user input related to a provision included in the merged contract. In some embodiments, the GUI can include a field in one or more display areas indicating a contract status. Other objects included in the GUI can include an event status indicator, and user selectable tabs to control the display of information within a particular area of the GUI.

BRIEF DESCRIPTION OF THE DRAWINGS

Aspects of this disclosure will become apparent upon reading the following detailed description and upon reference to the accompanying drawings, in which like references may indicate similar elements.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Figure 1:
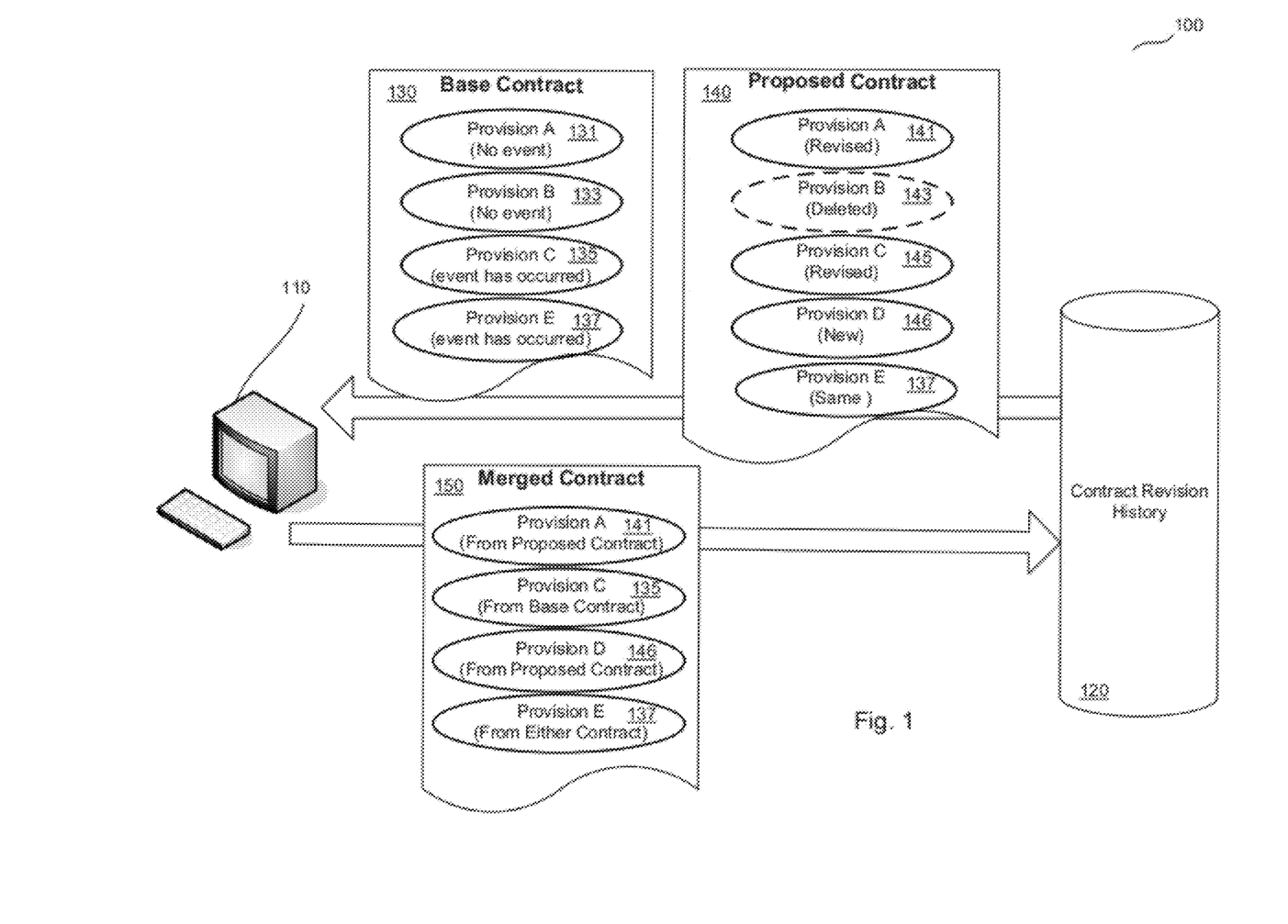
FIG. 1 is a diagram illustrating a system for generating a merged contract according to various embodiments of the present disclosure.

Referring first to FIG. 1, a system and procedure for generating a merged contract is discussed according to various embodiments of the present disclosure. System 100 includes Terminal 110 and Database 120, which can be used to store contract revision histories for one or more contracts. Terminal 110 can be implemented as a server terminal, workstation, laptop, palmtop, mobile phone, or other suitable computing device capable of receiving user input, communicating with Database 120, and displaying information in any of various audio, visual, or tactile formats as desired. Terminal 110 may also be implemented as a thin client, in which a significant amount of computational capabilities are carried out by another processing device, such as a server hosting Database 120, or otherwise.

Database 120 can be used for storage and retrieval of various versions of a contract, and information associated with one or more of the contracts' versions. The amount, level, and detail of the history stored in Database 120 can be adjusted as desired, consistent with storage availability, and hardware, software, network, cost or other considerations. For example, subject to storage limitations, some or all versions of multiple contracts can be maintained in Database 120. Additionally, an audit trail including, for example, some or all approval requests and decisions, can also be stored in Database 120. In some embodiments, the entire contract history, including original contracts, proposed changes, merged contracts, dates, authors, approval or rejection histories, and the like, are stored in Database 120. Furthermore, various events affecting either an entire contract or individual provisions of contract versions can also be stored in Database 120.

Although illustrated as a single, stand-alone database, Database 120 can be part of a server, a workstation, a personal computing device, or other suitable device including physical storage. In some embodiments, Database 120 can be a collection of individual databases, each of which can be remotely located in relationship to any of the other databases included in Database 120. In some such embodiments, Database 120 communicates with Terminal 110 and any individual database included in Database 120 via the Internet, the public switched telephone network (PSTN), or another suitable communication network. In other embodiments, Terminal 110 and Database 120 can be co-located, and can even be part of a single server system.

As illustrated in FIG. 1, Database 120 can store various versions of a contract, for example Base Contract 130, Proposed Contract 140, and Merged Contract 150, each of which includes various provisions. As used herein, a collection of one or more provisions is referred to as a contract. The terms "base contract" and similar terms are used to indicate a contract version to which proposed changes are compared and may be applied. A base contract may be, but is not necessarily, an original and first version of a contract. In some embodiments, after a base contract and a proposed contract are merged, the new, merged contract becomes the base contract for purposes of future merge procedures. The term "proposed contract" is used herein to indicate one or more provisions to be added to, removed from, or changed in a base contract.

The term "contract" is not to be strictly interpreted as referring only to legally binding agreements, although legally binding contracts are included in the meaning, but is to be interpreted in a more general matter to encompass even some agreements which may not be legally formed and binding For example, a "contract" may refer to an agreement, a proposal, or some similar collection of provisions which can indicate the occurrence of events, or a party's rights and duties to perform certain actions.

In general, provisions included in Base Contract 130 can be merged with provisions in Proposed Contract 140 to form Merged Contract 150. As illustrated in FIG. 1, Base Contract 130 and Proposed Contract 140 can be delivered from Database 120 to Terminal 110, where the various provisions can be processed and selected for inclusion in Merged Contract 150. Terminal 110, as illustrated by the information flow arrows of FIG. 1, can send Merged Contract 150 to Database 120 for storage as part of the contract history. In some embodiments, Merged Contract 150 can serve as a base contract for generating future merged contracts.

In some embodiments, some or all processing of provisions included in Base Contract 130 and Proposed Contract 140 is performed at a server or other computing system associated with Database 120, or at a terminal (not illustrated) other than Terminal 110. In some such embodiments, Database 120 may display information related to Base Contract 130, Proposed Contract 140 and Merged Contract 150 at Terminal 110, and a user of Terminal 110 can indicated approval, disapproval, further proposed changes, or provide other input to Database 120 or another processing system.

Provisions included in Base Contract 130 can be initially submitted to Database 120 based on user input to Terminal 110. Likewise, input from a sales representative, sales manager, station manager, customer, or other user can be used to enter provisions included in Proposed Contract 140, and delivered to Database 120 for storage. In at least one embodiment, multiple terminals (not illustrated) are provided for multiple users at different locations. In some embodiments different authorization or access privileges can be provided based on a terminal's identification or location, or based on a user's identity. Thus, particular users may be able to store proposed contract provisions, approve provisions for inclusion in Merged Contract 150, enter various data, or perform desired functions as authorized.

Data, contract provisions, or other information entered by users, can be stored in separate logical or physical locations of Database 120 to facilitate information security, minimize storage space, or otherwise. In some instances, where Terminal 110 is located at a customer site, the information can be stored local to Terminal 110 until the information is retrieved by another terminal or processing system associated with Database 120, or until delivered to Database 120 via physical media, a communication network, or otherwise.

System 100 can be used to merge a variety of different contract types from any of various industries, including broadcast contracts related to the radio industry. Consider the following example, in which System 100 is used to generate a merged contract relating to a radio industry contract. Base Contract 130 includes Provision A 131 relating to a radio spot to be aired. Base Contract 130 can also include Provision B 133 relating to contract costs, Provision C 135 relating to general contract parameters, and Provision E 137 relating to contract billing. Proposed Contract 140 includes Revised Provision A 141, Revised Provision C 145, New Provision D 146, and Provision E 137. Deleted Provision B 143 is illustrated to indicate the absence of a provision corresponding to Provision B 133.

A merged contract, for example Merged Contract 150, may include various contract provisions selected from Base Contract 130 and Proposed Contract 140. In the illustrated example, Merged Contract 150 includes Provision A 141, selected from Proposed Contract 140; Provision C 135, selected from Base Contract 130; Provision D 146, selected from Proposed Contract 140; and Provision E 137, selected from either Base Contract 130 or Proposed Contract 140. Merged Contract 150 can also include various other provisions and information related selected from either Base Contract 130 and Proposed Contract 140.

Selecting between contract provisions from Base Contract 130 and Proposed Contract 140 can be performed with or without a direct comparison of corresponding contract provisions. In at least one embodiment, for example, a determination can be made regarding whether an event affecting a provision of Base Contract 130 has occurred, and if so, choosing the affected provision of Base Contract 130 for inclusion in Merged Contract 150. Provisions in Proposed Contract 140 corresponding to unaffected provisions of Base Contract 130, along with any new provisions in Proposed Contract 140, can also be chosen for inclusion in Merged Contract 150. In this way, laborious comparison of the exact terms of provisions in Proposed Contract 140 can be largely avoided. Other embodiments, in which corresponding provisions of Base Contract 130 and Proposed Contract 140 are directly compared to determine changes, can also be implemented.

For example, Base Contract 130 includes Provision A 131, which may identify a radio spot and a future air date. Proposed Contact 140 includes a corresponding provision, Revised Provision A 141, which may specify a different radio spot to be aired on the same future date indicated by Provision A 131. Because the air date of the radio spot is still in the future, Provision A 131 can be changed without effecting Base Contract 130. Thus, because an event affecting Provision A 131 has not occurred, Revised Provision A 141 can be chosen for inclusion in Merged Contract 150.

Contrast the previous example with a case in which Provision C 135 designates a sales commission that has already been paid. Assume, for purposes of this example, that Revised Provision C 145 designates a different sales commission than the commission set forth in Provision C 135. Because the sales commission referred to in Provision C 135 has already been paid, in at least one embodiment, Revised Provision C 145 is not selected. Instead, because an event affecting Provision C 135, e.g. payment of the commission, has already occurred, Provision C 135 from Base Contract 135 is selected for inclusion in Merged Contract 150.

In cases where a proposed contract would delete a provision of a base contract, a determination of whether or not an event affecting a provision in the base contract has occurred can still be used to select whether to include a base contract provision in a merged contract. For example, Base Contract 130 includes Provision B 133, while Proposed Contract 140 includes Deleted Provision B 143. If no event affecting Provision B 133 has occurred, Merged Contract 150 will not include Provision B. If, however, an event affecting Provision B 133 has occurred, Provision B 133 from Base Contract 130 can be selected for inclusion in Merged Contract 150.

Provisions in a proposed contract that do not have a corresponding provision in a base contract can, in some embodiments, be included automatically in a merged contract. For example, Base Contract 130 does not have a provision that corresponds to New Provision D 146 in Proposed Contract 140. Thus, in at least one embodiment, New Provision D 146 is included by default in Merged Contract 150. In other embodiments, one or more checks can be performed to determine if New Provision D 146 violates any business rules, or if New Provision D 146 is so closely related to a provision in Base Contract 130 that inclusion of New Provision D 146 in Merged Contract 150 would improperly change another provision included in Merged Contract 150.

Provision E 137 is included in Base Contract 130 and Proposed Contract 140. In at least one embodiment, Merged Contract 150 will include Provision E 137, regardless of whether an event affecting Provision E 137 has occurred. Because both Base Contract 130 and Base Contract 140 include a substantially similar provision, e.g. Provision E 137, the provision can, in some embodiments, be selected from either Base Contract 130 or Proposed Contract 140. In implementations, a default may be set to allow any unchanged provisions in Base Contract 130 to be included in Merged contract 150. In other embodiments, the default may be to include provisions of Proposed Contract 140 in Merged Contract 150, absent a reason not to include them.

Figure 2:
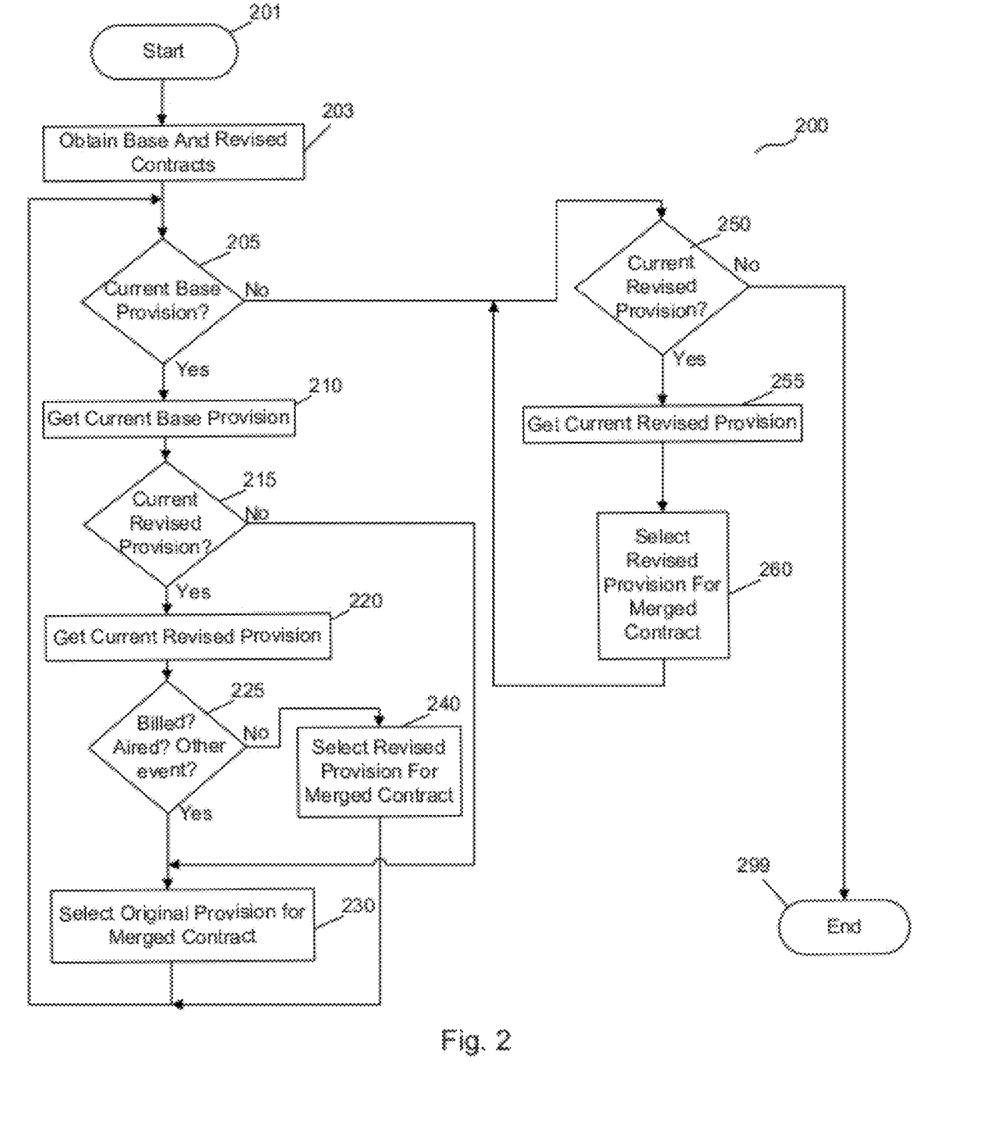
FIG. 2 is a flow chart illustrating a method according to various embodiments of the present disclosure.

Referring next to FIG. 2, a method 200 according to embodiments of the present disclosure will be discussed. Method 200 begins at block 201. As illustrated by block 203, a base contract and a revised contract are obtained. Either or both of the contracts can be retrieved from a database or the like, in any of various formats. For example, provisions of the base contract or the revised contract may be stored in text files using various delimiting characters to indicate data separation. The provisions may also be obtained from a form stored in any of various formats, for example a portable data format form or the like. Alternatively, either or both contracts can be obtained by requesting and receiving user input from a local or remote terminal, server, processing system, or other device configured to receive user input and communicate that input as requested.

As illustrated by block 205, a check can be made to determine whether the base contract includes a current base provision. The term current base provision generally refers to a provision in the base contract to be processed. The check can include a database query, a request for user input, a form field evaluation process, an optical character recognition process, and other similar process that can be used in evaluating the presence of a provision in the base contract to be processed. For example, if method 200 is being used to process provisions of the base contract related to radio spotlines, a check can be made to determine whether the initial base contract includes any unprocessed spotlines, any spotlines that need to be processed or reprocessed, or whether the base contract even includes any spotlines. In a case where method 200 is being utilized to evaluate other contract provisions, e.g. general contract terms, various contract options, charges, costs, Internet or Web details, contract terms related to media other than radio, billing plans, or the like, the check performed at block 205 can be used to determine if one or more desired contract provisions or types of provisions are present in the base contract, and whether those provisions require processing.

As illustrated by block 210, in response to a determination that there is current base provision, the current base provision is retrieved. The provision can be retrieved form volatile or non-volatile memory present in a processing system performing method 200, from a mass storage device accessible via a local area network, a wide area network, or via a dedicated connection to a processing system implementing method 200, from direct or recorded user input, or from another desired source.

At block 215 another check is made to determine whether a current revised provision is present. A current revised provision includes a provision in the revised contract that is to be processed. In various embodiments, provisions in the base contract and the revised contract are organized so that a relationship between their provisions is capable of being identified. For example, a provision for a contract charge in the base contract can be assigned a provision number that matches a corresponding provision in the revised contract, if such a revised provision is present. Other means of establishing a relationship between provisions of the base contract and the revised contract, for example physical proximity, grouping, labels, or the like can also be used.

The check for a current revised provision can include a check to determine whether or not there are any provisions in the revised contract related to the current base provision. If the revised contract includes unprocessed related provisions, or in some embodiments if there are one or more related provisions present, regardless of whether the related provisions have been previously processed, a check performed at block 215 can return a positive result.

In some embodiments, the check performed at block 215 can include both a check to determine whether a current revised provision is present, and a secondary check to determine whether that current revised provision is the same as the current base provision. However, in at least one embodiment no direct comparison of the current revised provision and the current base provision is performed.

As illustrated by block 220, a current revised provision can be obtained using any of various techniques for obtaining information discussed herein, or their equivalents.

As illustrated by block 225, an evaluation can be performed to determine if an event affecting the current base provision or the current revised provision has occurred. Information concerning events affecting the current base provision or the current revised provision can be stored and retrieved with the base contract, with the revised contract, or otherwise. In some embodiments, whether or not an event affecting a provision has occurred can be determined based on user input obtained prior to, during, or after the execution of one or more portions of method 200. In some embodiments, information used to determine whether an event affecting a provision has occurred can be obtained from a data source other than a data source from which the base contract or the revised contract are obtained.

Information regarding the occurrence of events affecting the provisions can be obtained from multiple different sources, and can vary depending on the type of provision or the specific provision being processed. For example, a billing event can be retrieved from an accounting system, and may affect multiple different provisions, including a cost provision, a spotline provision, a web broadcast provision, a general contract provision, and others. Another event, for example a charge event, may affect one or more different provisions, than those affected by a billing event.

In some embodiments, an event affecting the provision can be identified based on a listing of events selected according to business needs, the type of contract, the provisions of the contract, or as otherwise desired. Such a listing of events can be automatically updated on a periodic or semi-periodic basis, or can be updated manually as deemed appropriate. Other embodiments do not employ such a listing of events, but instead can use various information sources to determine whether such an event affecting a provision has occurred based on various rules used alone or in conjunction with user input and data evaluation techniques.

At least one embodiment performs a check of only one or the other of the current base provision and the current revised provision, while other embodiments can check for events affecting either or both the current base provision and the current revised provision.

As illustrated by block 230, if block 225 returns a positive result, which indicates that an event affecting a provision has occurred, the current base provision is selected for inclusion in the merged contract. The current revised provision can also selected for inclusion in the merged contract at block 230, if the result of the determination at block 215, indicates that there is no current revised provision.

As indicated by block 240, if the result of the determination at block 225 indicates that no event affecting the provision under consideration has occurred, the current revised provision is selected for inclusion in the merged contract. Another check can then made to determine if any more base provisions are to be processed, as illustrated by block 205.

Refer again to block 205, which illustrates that a check can be made to determine if a current base provision is present. As illustrated by block 250, if there is no current base provision to be processed, a check is performed to determine if a there is a current revised provision. If there is no current revised provision, method 200 ends as illustrated by block 299.

As illustrated by block 255, a current revised provision is obtained if the result of the check illustrated by block 250 indicates that there is a revised provision to be processed. As illustrated by block 260, the current revised provision can be selected for inclusion in the merged contract. Another check can then made to determine if any more revised provisions are to be processed, as illustrated by block 250.

The various blocks illustrating method 200 can, in some instances be reordered or altered without departing from the spirit and scope of the present disclosure. For example, rather than checking for a current base provision as illustrated by block 205 before checking for a current revised provision as illustrated by block 215 or block 250, a check could be made first to determine if there are any current revised provisions and a follow-on check could be made for current base provisions. In some embodiments that implement this alteration, actions illustrated by other blocks could also be reordered to maintain consistent operation. Other changes and alterations consistent with this disclosure can also be made.

Figure 3:
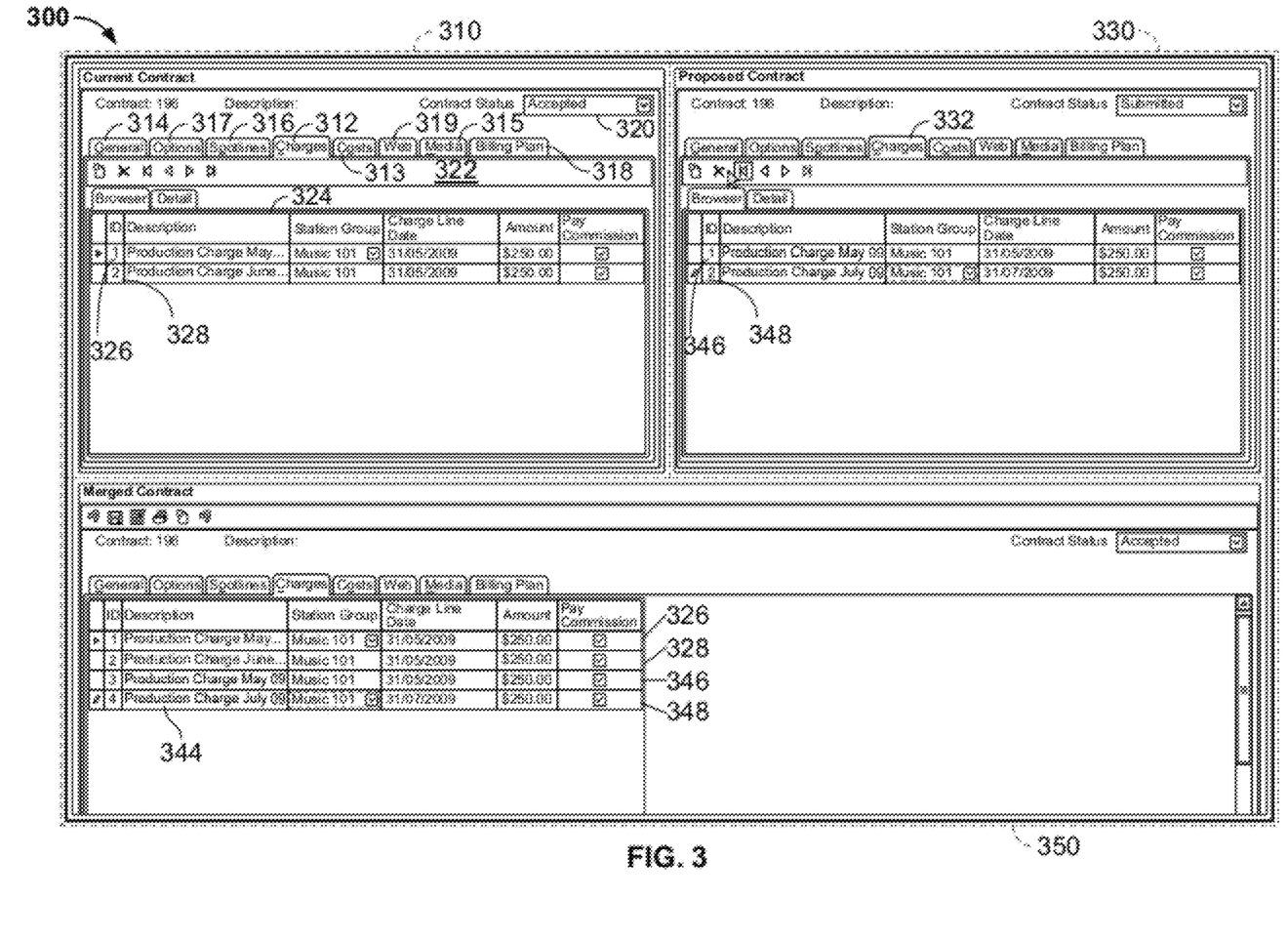
FIG. 3 depicts a graphical user interface (GUI) screen displayed according to an embodiment of the present disclosure.

Referring next to FIG. 3, a graphical user interface (GUI) is discussed according to various embodiments of the present disclosure. GUI 300 includes multiple sections displayed concurrently, with each section related to a particular version of a contract: Current Contract Section (CCS) 310 displays information related to provisions of a base contract; Proposed Contract Section (PCS) 330 displays information related to provisions of a proposed contract, and Merged Contract Section (MCS) 350 displays information related to provisions of a merged contract, where the provisions of the merged contract can be selected from provisions included in the based contract and the proposed contract. In some embodiments, provisions can be added to the merged contract directly from GUI 300, even if the provision is not included in the base or proposed contract.

CCS 310 displays various tabs, buttons, icons, text, or other suitable images, some of which can be made user selectable to facilitate ease of use and functionality with regard to the contract, contract merging, and contract approval process. By way of example, but without limitation, CCS 310 includes General Tab 314, which can be selected to display general contract options included in a base contract; Options Tab 317 to display contract options included in a base contract; Spotlines Tab 316, which can be selected to display spotlines included in a base contract; Charges Tab 312, which can be utilized to change the information displayed in CCS 310 to indicate charges included in a base contract; Cost Tab 313; Web Tab 319 to display information related to Internet or Web related contract items; Media Tab 315; and Billing Plan Tab 318. CCS 310 also includes Contract Status Indication 320, which can be used to indicate an acceptance or approval status, and Information Display Area 324, which can be used to display information corresponding to a selected tab. PCS 330 and MCS 350 can each include elements similar to those displayed in CCS 310.

In the embodiment of GUI 300 illustrated in FIG. 3, Charges Tab 312 is selected, thereby causing Information Display area 324 to display base contract charge provisions, which include First Production Charge 326 and Second Production Charge 328. Likewise, PCS Charges Tab 332 is selected, so that Third Production Charge 346 and Fourth Production Charge 348 are displayed, indicating charges included in a proposed contract.

For purposes of this example, it is presumed that no conflicts exist between the various charge provisions of the base contract and the proposed contract, and that no events affecting contract provisions have occurred. As a result, all four charge provisions 326, 328, 346, and 348 are selected for inclusion in the merged contract, and are displayed in MCS 350. In at least one embodiment, if one or more events affecting provisions of the base contract had occurred, then MCS 350 could be configured to automatically, semi-automatically, or manually display the affected provisions from CCS 310, display unaffected provisions from PCS 330. In other embodiments, all charge provisions can be displayed in MCS 350, and a user can select which of the provisions are to be included in the merged contract.

By displaying a section for multiple contract versions, e.g. the base contract, the proposed contract, and the merged contract, a more complete picture of the modification history of the contract can be presented to a user, thereby enabling an approving or authorizing supervisor, sales representative, customer, or other user a clear picture of proposed changes to a contract. In some embodiments, changes to the merged contract can be entered directly into GUI 300, which can help to limit the number of approval iterations that might otherwise be needed.

Figure 4:
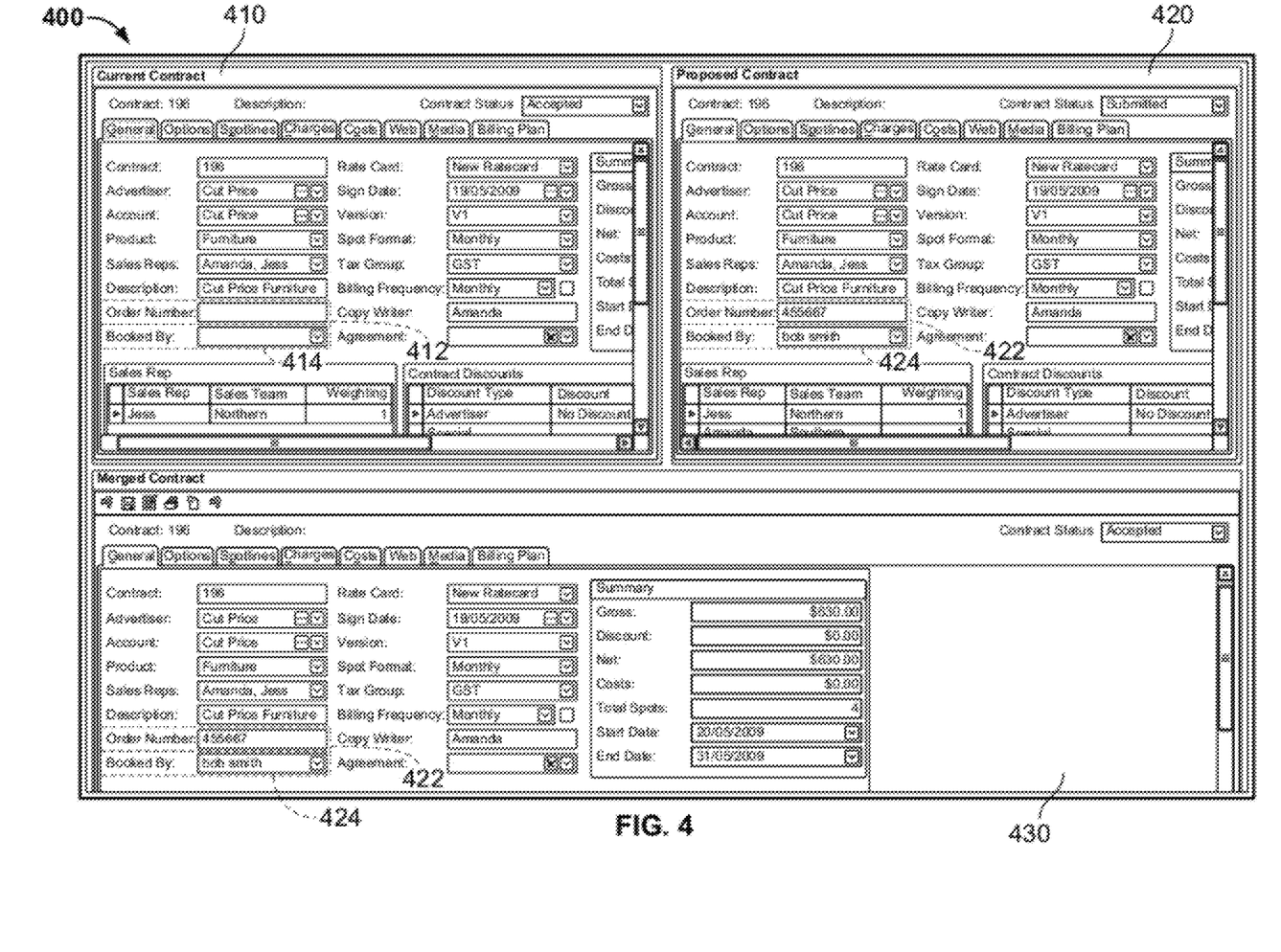
FIG. 4 shows another GUI screen according to an embodiment of the present disclosure.

Referring next to FIG. 4, GUI 400 is illustrated according to various embodiments of the present disclosure. GUI 400 includes three primary display areas, for example Current Contract Area (CCA) 410, Proposed Contract Area (PCA) 420, and Merged Contract Area (MCA) 430, each of which displays information related to a corresponding contract version. Each of the three areas of GUI 400 includes a tab entitled "General," which is selected to cause general contract provisions to be displayed for each of the corresponding contract versions. CCA 410, which is used to display provisions from a base contract, includes fields Order Number (Unfilled) 412 and Booked By (Unfilled) 414. Note that PCA 420, which is used to display provisions included in a proposed contract, includes completed fields Order Number (Filled) 422 and Booked By (Filled) 424.

Because, for purposes of this example, no events affecting the contract provisions displayed in CCA 410 have occurred, the provisions displayed in PCA 420, namely Filled Order Number 422 and Filled Booked By 424, have been selected for inclusion in the merged contract, and for display in MCA 430. In some embodiments, general contract provisions can be selected from the proposed contract by default. In other embodiments, general contract provisions can be selected from the base contract by default.

It should be appreciated that although each of the three illustrated areas CCA 410, PCA 420, and MCA 430 show the same tab selected, in some embodiments different tabs can be selected in one or more of the display areas included in GUI 400. Thus, CCA 410 can have the Spotlines tab selected, the Charges tab of PCA 420 can be selected, while the General tab of MCA 430 is used to display general contract provisions. Furthermore, in some embodiments of GUI 400, one or more of CCA 410, PCA 420 and MCA 430 can be expanded to fill different portions of the screen, with any one of them being able to temporarily conceal all or a portion of the other sections as desired to facilitate information viewing.

Some or all of the methods and processes described herein can be embodied in or performed by one or more processing systems. An example of such a processing system is discussed with reference to FIG. 5. Processing system 500 includes random access memory (RAM) 520; read-only memory (ROM) 515, wherein the ROM 515 could also be erasable programmable read-only memory (EPROM) or electrically erasable programmable read-only memory (EEPROM); and input/output (I/O) adapter 525, for connecting peripheral devices such as disk units 530, optical drive 536, or tape drive 537 to system bus 510; a user interface adapter 540 for connecting keyboard 545, mouse 550, speaker 555, microphone 560, or other user interface devices to system bus 510; communications adapter 565 for connecting processing system 500 to an information network such as the Internet or any of various local area networks, wide area networks, telephone networks, or the like; and display adapter 570 for connecting system bus 510 to a display device such as monitor 575. Mouse 550 has a series of buttons 580, 585 and may be used to control a cursor shown on monitor 575.

Figure 5:
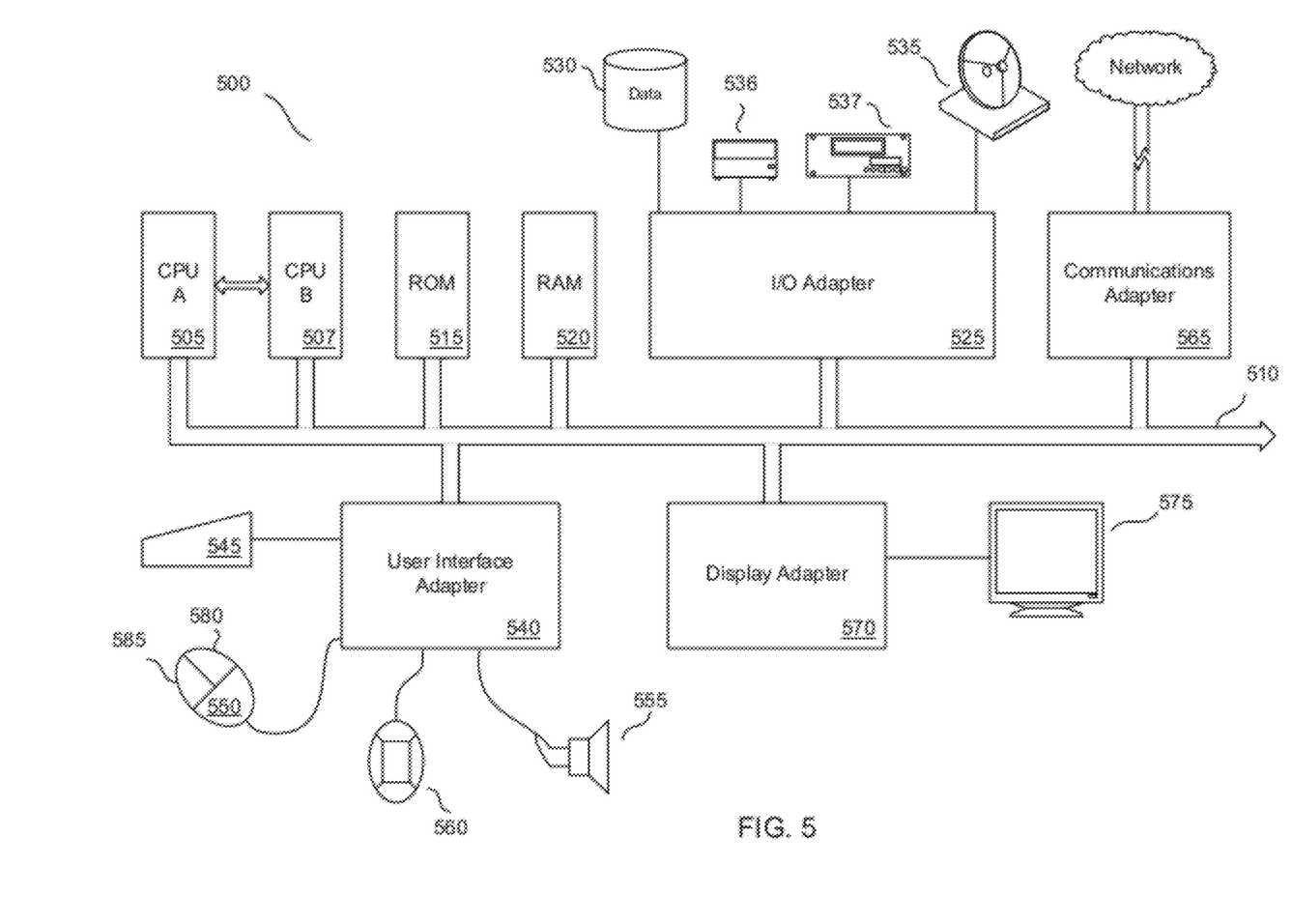
FIG. 5 is a high level block diagram of a processing system according to an embodiment of the present disclosure.

It will be understood that processing system 500 may include other suitable data processing systems without departing from the scope of the present disclosure. For example, processing system 500 may include bulk storage and cache memories, which provide temporary storage of at least some program code in order to reduce the number of times code must be retrieved from bulk storage during execution.

Various disclosed embodiments can be implemented in hardware, software, or a combination containing both hardware and software elements. In one or more embodiments, the invention is implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, or other suitable instruction execution system.

For the purposes of this description, a computer-usable or computer readable medium can be any apparatus that can contain, store, communicate, or transport the program for use by or in connection with an instruction execution system, apparatus, or device. By way of example, and not limitation, computer readable media may comprise any of various types of computer storage media, including volatile and non-volatile, removable and non-removable media implemented in any suitable method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Various embodiments have been described for delivering content related to a commercial media program. Other variations and modifications of the embodiments disclosed may be made based on the description provided, without departing from the scope of the invention as set forth in the following claims.

What is claimed is:

1. A contract management system comprising:
a server computer hosting a database, the database storing contract version information associated with a plurality of versions of a broadcast contract related to a radio industry, wherein the plurality of versions of the broadcast contract include a base version of the broadcast contract including base contract provisions, and a proposed version of the broadcast contract including proposed contract provisions;
a computer terminal configured to communicate with the server computer to obtain the contract version information and to generate a graphical user interface (GUI) including:
a first area displaying base information associated with a base version of the broadcast contract, wherein the base information associated with the base version of the broadcast contract includes at least one base contract provision relating to a radio spot, the at least one base contract provision obtained from the database;
a second area displaying proposed information associated with a proposed version of the broadcast contract, wherein the proposed information associated with the proposed version of the broadcast contract includes at least one proposed contract provision relating to the radio spot, the at least one proposed contract provision obtained from the database; and
a third area displaying merged information associated with a merged version of the broadcast contract, wherein the merged information associated with the merged version of the broadcast contract includes either the at least one base contract provision or the at least one proposed contract provision; and
the server computer further configured to select which of the at least one base contract provision or the at least one proposed contract provision to include in the merged version of the broadcast contract based, at least in part, on whether the radio spot has already aired.

2. The contract management system of claim 1, wherein the third area is capable of accepting user input related to the at least one base contract provision or the at least one proposed contract provision included in the merged version of the broadcast contract.

3. The contract management system of claim 1, wherein the GUI further comprises a field in at least one of the first area, the second area, and the third area indicating a contract status.

4. The contract management system of claim 1, wherein the third area displays at least one provision selected from the base version of the broadcast contract, and at least one provision selected from the proposed version of the broadcast contract.

5. The contract management system of claim 1, wherein the GUI further includes at least one event status indicator indicating whether an event related to the radio spot being aired has already occurred.

6. The contract management system of claim 1, wherein the GUI further includes at least one user selectable tab in each of the first area, the second area, and the third area, each user selectable tab controlling which contract provisions are displayed in each respective area.

7. A method comprising:
storing, in a database hosted by a server computer, contract version information associated with a plurality of versions of a broadcast contract;
transmitting, from the server computer to a mobile device, contract version information;
generating, at the mobile device, a graphical user interface (GUI) based on the contract version information, wherein generating the GUI includes:
displaying, using the GUI, a base contract provision of a base version of the broadcast contract, wherein the base contract provision is associated with a radio spot;
displaying, using the GUI and concurrently with the base contract provision, a proposed contract provision of a proposed version of the broadcast contract, the proposed contract provision to be considered for replacement of the base contract provision, wherein the proposed contract provision is associated with the radio spot;
selecting, by the server, either the base contract provision or the proposed contract provision as a merged contract provision to be included in a merged contract, wherein the selecting is based, at least in part, on whether an event affecting the base contract provision has already occurred, wherein the event is related to the radio spot being aired;
transmitting, from the server to the mobile device, the merged contract provision; and
wherein generating the GUI further includes displaying, using the GUI and concurrently with the base contract provision and the proposed contract provision, the merged contract provision.

8. The method of claim 7, further comprising:
displaying, using the GUI, a plurality of merged contract provisions selected from a plurality of base contract provisions and a plurality of proposed contract revisions, the plurality of merged contract provisions selected based on whether a potential merged contract provision is present in both the base contract and the proposed contract.

9. The method of claim 7, wherein the base contract provision includes a base charge and the proposed contract provision includes a proposed charge, the method further comprising:
displaying, using the GUI, the base charge as part of the merged contract provision if at least a portion of the base charge has been billed; and
displaying, using the GUI, the proposed charge as part of the merged contract provision if the at least a portion of the base charge has not been billed.

10. The method of claim 7, wherein the base version of the broadcast contract includes a base billing plan and the proposed version of the broadcast contract includes a proposed billing plan, the method further comprising:
displaying, using the GUI, the base billing plan as part of a merged contract display if at least a portion of the base billing plan has been billed; and
displaying, using the GUI, the proposed billing plan as part of the merged contract display if the at least a portion of the base billing plan has not been billed.

11. The method of claim 7, further comprising:
displaying, using the GUI, a base spotline included in the base version of the broadcast contract as part of the merged contract if at least a portion of the base spotline has aired; and
displaying, using the GUI, a proposed spotline included in the proposed version of the broadcast contract, if the at least a portion of the base spotline has not aired.

12. The method of claim 7, further comprising:
displaying, using the GUI, at least one general field of the merged version of the broadcast contract based, at least in part, on whether the base version of the broadcast contract has been at least partially performed.

13. The method of claim 7, further comprising:
displaying a contract history that includes the base version of the broadcast contract, the proposed version of the broadcast contract, and the merged version of the broadcast contract.

14. A system comprising:
a memory configured to store a program of computer readable instructions;
a processing system operably coupled to the memory and configured to execute the program of instructions stored in the memory, the program of instructions comprising:
   at least one instruction to obtain from a database hosted by a server, a base version of a broadcast contract including a base contract provision, and a proposed version of the broadcast contract including a proposed contract provision;
   at least one instruction to determine whether an event affecting the base contract provision has occurred and generate an indication thereof, wherein the event is associated with airing of a radio spot associated with the base contract provision or the proposed contract provision; and
a display coupled to the memory and the processing system, the display configured to display a graphical user interface (GUI) under control of the processing system, the GUI comprising:
   a first area displaying information to be included in the base contract provision;
   a second area displaying information to be included in the proposed contract provision; and
   a third area displaying information to be included in a merged contract provision included in a merged version of the broadcast contract, the merged contract provision including either the base contract provision or the proposed contract provision, wherein inclusion of the base contract provision or the proposed contract provision as the merged contract provision is based, at least in part, on the indication generated by the at least one instruction to determine whether an event affecting the first contract provision has occurred.

15. The system of claim 14, wherein the GUI is further configured to display:
   a plurality of merged contract provisions selected from a plurality of base contract provisions, and a plurality of proposed contract revisions, the plurality of merged contract provisions selected based, at least in part, on whether a potential merged contract provision is present in both the base version of the broadcast contract and the proposed version of the broadcast contract.

16. The system of claim 14, wherein the base contract provision includes a base charge and the proposed contract provision includes a proposed charge, the GUI further configured to display as part of the merged contract provision:
   the base charge, if at least a portion of the base charge has been billed; and
   the proposed charge, if the at least a portion of the base charge has not been billed.

17. The system of claim 14, wherein the base version of the broadcast contract includes a base billing plan and the proposed version of the broadcast contract includes a proposed billing plan, the GUI further configured to display as part of the merged contract provision:
   the base billing plan, if at least a portion of the current original billing plan has been billed; and
   the proposed billing plan if the at least a portion of the base billing plan has not been billed.

18. The system of claim 14, wherein the GUI is further configured to display as part of the merged contract provision:
   a base spotline included in the base contract, if at least a portion of the base spotline has aired; and
   a proposed spotline included in the proposed contract, if the at least a portion of the current original spotline has not aired.

19. The system of claim 14, the GUI further configured to display at least one general field of the merged version of the broadcast contract based, at least in part, on whether the base version of the broadcast contract has been at least partially performed.

20. The system of claim 14, further comprising:
   at least one instruction to store a contract history that includes the base version of the broadcast contract, the proposed version of the broadcast contract, and the merged version of the broadcast contract.

* * * * *